Aug. 25, 1931.  E. L. MOLINE  1,820,084

AUTOMOBILE WHEEL

Filed Sept. 8, 1930  3 Sheets-Sheet 1

Inventor

*Ernest L. Moline*

By *Clarence A. O'Brien*

Attorney

Aug. 25, 1931.     E. L. MOLINE     1,820,084
AUTOMOBILE WHEEL
Filed Sept. 8. 1930     3 Sheets-Sheet 2

Inventor
Ernest L. Moline

By Clarence A. O'Brien
Attorney

Aug. 25, 1931.  E. L. MOLINE  1,820,084
AUTOMOBILE WHEEL
Filed Sept. 8, 1930   3 Sheets-Sheet 3
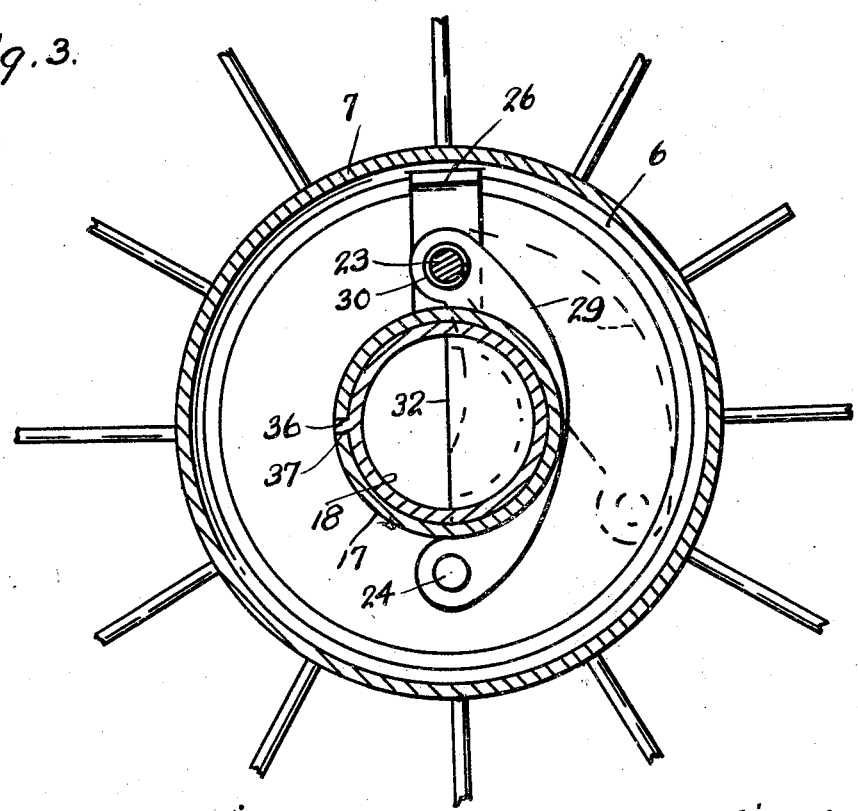
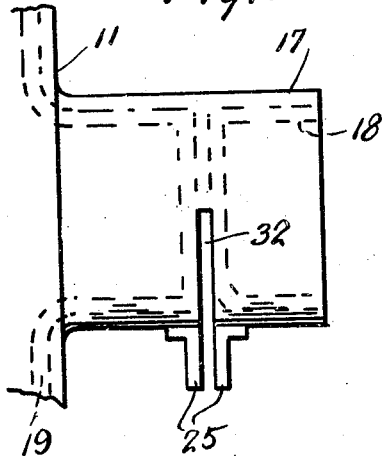
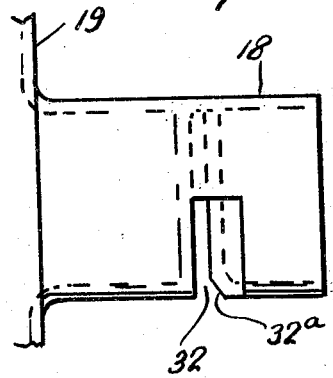
Inventor
*Ernest L. Moline*
By *Clarence A. O'Brien*
Attorney Patented Aug. 25, 1931

1,820,084

UNITED STATES PATENT OFFICE

ERNEST L. MOLINE, OF MEAD, NEBRASKA

AUTOMOBILE WHEEL

Application filed September 8, 1930. Serial No. 480,520.

This invention relates generally to automobile wheels and particularly to a wheel which may be quickly and easily taken off and put on without the use of tools, and in less time than is required to remove any conventional type of automobile wheel generally in use.

It is well known that it is a disagreeable task to exchange wheels, and that the operation requires some time.

It is also well known that it is a comparatively easy matter to spoil the threads of the usual nuts and bolts used to maintain the conventional type of automobile wheel in place; and that under certain conditions, such as mud, deep sand, or in darkness, nuts and the tools used in the removing and replacing operation of the conventional automobile wheel may be readily displaced and lost, and prevent the proper and expeditious exchanging of wheels.

It is an object of this invention to provide an automobile wheel, which may be and is intended to be removed and replaced without the use of tools and without removing any part or minor portions of the wheel, and which requires much less time and effort in the operation of exchanging wheels on an automobile.

It is a further object of this invention to provide an automobile wheel, of the type described, which is simple and highly effective in operation, which is durable and comprises few parts.

It is a further object of this invention to provide an automobile wheel of the type described which has few and simple moving parts, and which presents no element in which wear can normally take place.

These and other objects which will be understood as the description proceeds, the nature of the invention, its arrangement and composition and combination of parts will be clearly understood by any one acquainted with the art to which this invention relates upon consulting the following descriptions of the drawings in which:—

Fig. 3 is a vertical transverse cross section taken from the left on the line 3—3 of Fig. 2.

Fig. 6 is a view in elevation of one of the interior cylindrical elements.

Fig. 7 is an elevational view of another of the cylindrical elements.

It is to be understood that I do not desire to limit the application of this invention to the particular modification set forth herein to illustrate the same, and any change or changes may be made in material and structure consistent with the spirit and scope of the invention.

Figure 1:
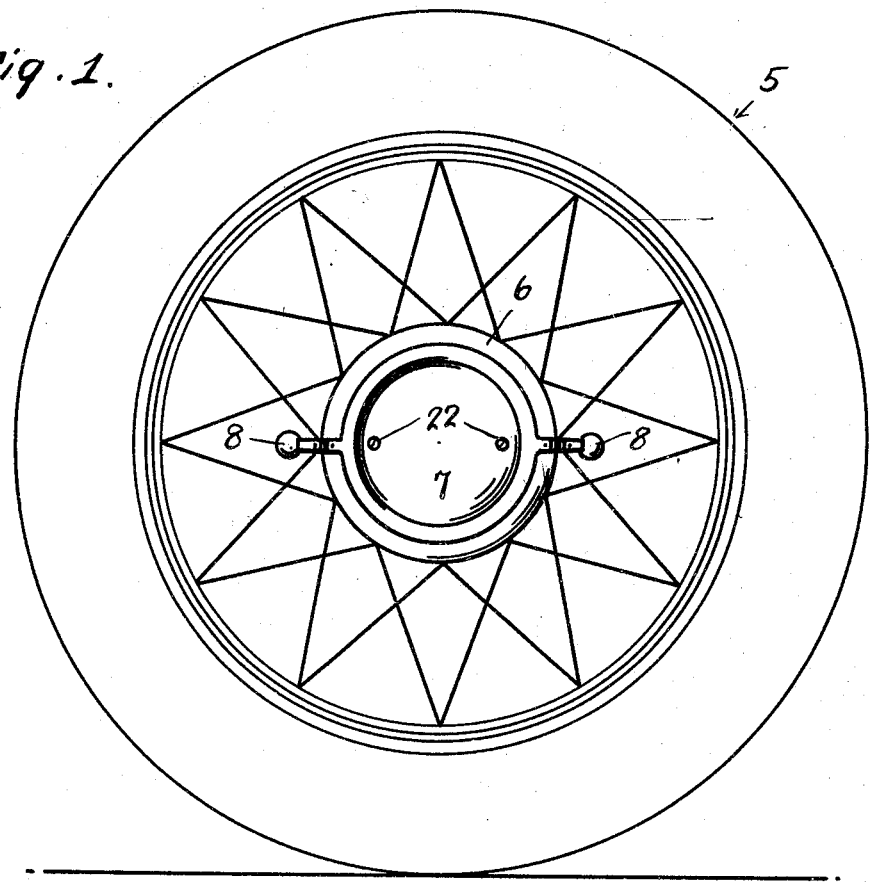
Figure 1 is a general view in elevation of my improved automobile wheel.
Figure 8:
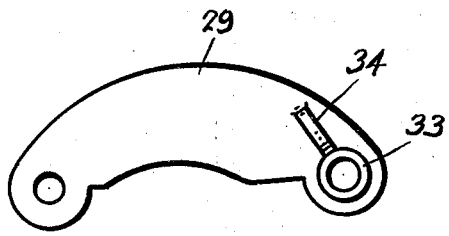
Fig. 8 is a top plan view of the clamping member.
Figure 9:
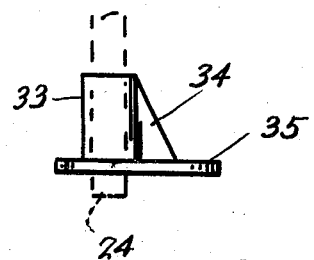
Fig. 9 is a side elevation of one of the brake elements.
Figure 10:
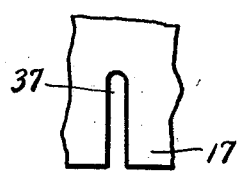
Fig. 10 and Fig. 11 illustrate cooperative elements which have the function of guiding my improved automobile wheel into attaching position.
Figure 11:
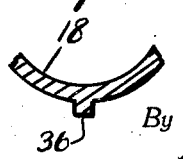
Figure 2:
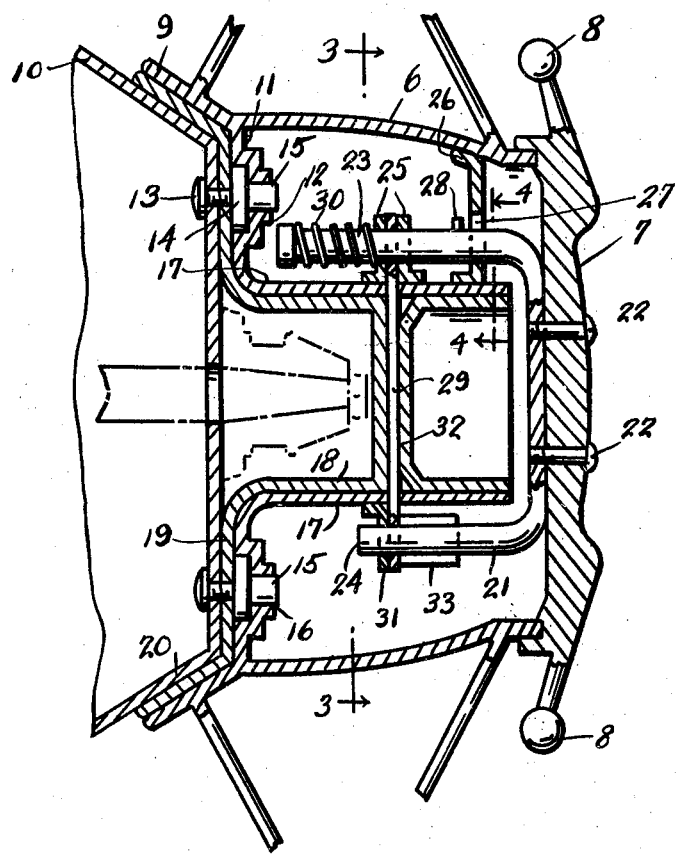
Fig. 2 is a vertical central section at 90° to Fig. 1, the assembly of the interior part of the improved automobile wheel.
Figure 4:
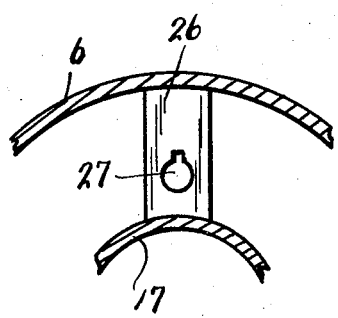
Fig. 4 is a detail partly in cross section taken from the right of Fig. 2 on the line 4—4 thereof.
Figure 5:
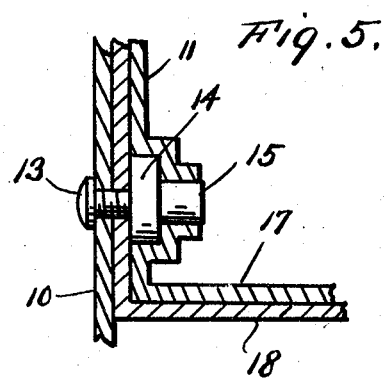
Fig. 5 is a detail section of the means of securing the stationary elements of my improved automobile wheel to a conventional brake drum.

Referring in detail to the drawings, the numeral 5 designates generally an automobile wheel of conventional configuration, and having a hub shell 6 which carries the spokes and is provided with a hub cap 7 which has a pair of handles 8 slightly inturned as seen in Fig. 2. The shell 6 has on its inner edge a flange 9 which is flared to conform with the shape of the brake drum.

The hub shell 6 has at its inner end an inward projection 11 which runs around the interior of the hub shell and at intervals there are outstruck shallow cylindrical forms 12 which are placed to coincide with the attaching bolts 13 carried by the brake drum 10. Within the shallow cylinder 12 is disposed a nut 14 to be screwed upon the bolt 13, and on the outer side of the nut 14 pins 15 projecting through apertures 16 in each of the shallow cylindrical formations 12.

The cylindrical formations 12 have a sliding fit upon pins 15, and the said pins are anchored by the bolt 13 to prevent the turning of the wheel with relation to the brake drum 10. On the inner edge of the flange 11 there is formed a cylinder 17 which projects outwardly quite near the outer edge of the hub shell 6 and within the cylinder 17 is another cylinder 18 which has an outwardly projected flange 19 on the inner edge and a skirt portion 20 angularly projected outwardly or downwardly from said flange 19.

The skirt portion is adapted to be engaged within the brake drum 10 as is the flange 19, and the flange 11 of the hub shell 6, and the three elements are closely held together by the bolt 13 and the nut 14. It should be borne in mind that the hub shell 6 and its formation are separable from the skirt portion 20 and flange portion 19 of the inner hub and the hub shell 6 is retained against relative rotation with said inner hub 18 by the pin 15.

Means for retaining the hub shell with its cylindrical formation on the interior flange 11 is operable by the handles 8 in such a way that an approximate half turn applied to rotate the handles after an outwardly pulling pressure has been applied thereto, will result in the separation of the hub shell 6 and hence the wheel in its entirety, from the position upon the pin 15 and in engagement with the brake drum structure.

The means consists of a J-shaped bar 21 which is attached to the under side of the hub cap 7 and by screws 22, so that leg portions 23 and 24 are in alinement with and parallel to the extension of the axle and the axis of rotation of the wheel.

Leg 23 is somewhat longer than the leg 24 and it is projected through a pair of brackets 25 mounted on the outside of the cylinder 17 and in which it is free to turn and slide longitudinally. A brace member 26 passes between the cylinder 17 and the hub shell 6 is attached near the outer end of the shell.

The brace 26 is provided with a keyhole opening 27. A peg 28 on the leg 23 is so arranged that at a certain point of the withdrawal of the leg 23 and its being turned, the peg will enter the keyhole and pass therethrough, and the leg 23 may be maintained in withdrawn position by correspondingly turning it so that the peg 28 will rest upon the upper side of the brace 26.

A half-moon latch 29 has one end between the brackets 25 and the leg 23 passes through the other end, in which it is free to slide and rotate. A coiled spring has one end engaging against the inner bracket 25 and the other against a nut 30 on the inner end of the leg 23 to retain the leg 23 inwardly. The J-shaped formation passes diametrically across the outer edge of the cylinders 18 and 17 and comes down at the other side in the shorter arm 24 which is journaled slidably and rotatably in brackets 31 mounted on the exterior of the cylinder 17 to one side of a cut 32 placed through the cylinders 17 and 18 in which latch 29 engages snugly. The lower end of the latch 29 is received on the leg 24 of the J-shaped bar 21.

A sleeve-like reinforcing element 33 acts as a brace for the arm 24 and the sleeve being provided with a web 34 and a right angularly disposed plate 35 which is attached to the edge of the latch 29.

A key 36 mounted on the lower outside of the cylinder 18 is adapted to be engaged by a slot 37 in the cylinder 17, guides the wheel into proper position to engage the pin 15 as it is being replaced. It should also be stated that the sleeve 33 acts as a guide for the arm 24 when replacing the wheel.

It should be noted that the slot 32 in the cylinder 17 is just wide enough to permit the latch to pass easily but snugly therein, and the slot in the cylinder 18 is wider at its outer edge and tapers gradually toward the point which is the same width as the slot in the cylinder 17.

As already stated, the wheel is taken off by grasping the handles 8 with a withdrawing motion and a slight turn to one side or the other depending on the arrangement of the clamp members chosen, said withdrawing action working against the spring 30 to withdraw the arm 23 outwardly until it passes its peg 28 through the keyhole 27 where a slight turn in the desired direction will effectively prevent the accidental return of the leg 24 under the action of the spring 30 in the manner already described.

The arm 24 coming through the bracket 31 will be permitted to swing the latch 29 out of the slot 32 in the cylinders 17 and 18, whereupon the shell 6 with its spokes and rim and tire mounting structure may be drawn completely off the pin 15 and out of engagement with the skirt portion 20 fixed to the brake drum 10 effecting the complete removal of the wheel, by a motion of withdrawal and a slight turn to one side or the other.

It is obvious that the replacement of the wheel is accomplished by a simple reversal of the process just outlined. The movement of the latch 29, as indicated in dotted lines in Fig. 3, the tapered portion of the slot 32 is illustrated at 32a in Fig. 7. The engaging parts may be galvanized or chromium plated or made of rustless material to prevent sticking from the formation of rust.

It will be evident from the foregoing descriptions and explanations of my improved automobile wheel, that I have provided a wheel that is positive and convenient in attaching and removing the same to an automobile, that is composed of few and simple and durable parts, which may be cheaply and easily manufactured, and which is highly satisfactory in operation and otherwise admirably suited for the purposes for which it was designed.

Having thus described my invention, what I claim as new is:—

1. An automobile wheel of the type described, comprising a pair of completely telescoping cylinders, flanges on the inner ends of said cylinder with retaining bolts through one of said flanges, and means associated with said flanges to retain said flanges and cylinders in position upon a brake drum, the outer of said cylinders being freely mounted on said retaining means, and a hub shell spaced from and fixedly mounted exterior of said outer cylinder for carrying the spokes of the wheel, said cylinders being provided with cuts approximately halfway through said cylinders, and means pivotally mounted on the outer of said cylinders for engaging in said cuts to thereby retain said outer cylinder and the hub shell carried thereby in close engagement with the inner of said cylinders and said retaining means, said last named retaining means adapted to prevent relative rotation of said hub shell with said inner cylinder.

2. A quick detachable automobile wheel of the type described comprising a brake drum structure, an axle carrying the brake drum structure, a cylinder having a flange abutting the outer face of the brake drum, bolts thru said drum and the flange, nuts on the bolts, projections on said nuts, and another cylinder having a flange, the said other cylinder and flange closely conforming to the exterior of the said cylinder and flange and freely movable thereon, and formations on the flange of the said other cylinder for engaging said projections for preventing relative rotation of cylinders; and a wheel spoke carrying hub shell disposed about and concentrically spaced from said cylinders and secured at its inner end to the flange on said other cylinder, and a hub cap on the outer end of the hub shell; and releasable means constructed on the inner side of the hub cap for engaging said cylinders and retaining them against relative longitudinal movement for maintaining said hub shell and said other cylinder and flange normally rigidly engaged with said formations and said brake drum structure, said releasable means comprising a pair of longitudinally and inwardly protruding bars, and brackets on the exterior of said other cylinder for slidably and pivotally receiving the ends of said bars, and a swingable latch member hinged to one of said bars and engageable by the other of said bars and adapted to be swung upon outward movement by rotation in one direction of said bars by the said hub cap into slots provided at one side of said cylinders, and handles on the exterior of the hub cap for manually rotating the same.

In testimony whereof I affix my signature.

ERNEST L. MOLINE.